(12) United States Patent
Nyman et al.

(10) Patent No.: US 7,444,513 B2
(45) Date of Patent: Oct. 28, 2008

(54) AUTHENTICATION IN DATA COMMUNICATION

(75) Inventors: Kai Nyman, Espoo (FI); Mikko Olkkonen, Kirkkonummi (FI); Jari T. Malinen, Mountain View, CA (US)

(73) Assignee: Nokia Corporiation, Espoo (FI)

( * ) Notice: Subject to any disclaimer, the term of this patent is extended or adjusted under 35 U.S.C. 154(b) by 706 days.

(21) Appl. No.: 09/867,049

(22) Filed: May 29, 2001

(65) Prior Publication Data

US 2002/0169966 A1 Nov. 14, 2002

Related U.S. Application Data

(63) Continuation-in-part of application No. 09/858,264, filed on May 14, 2001, now abandoned.

(51) Int. Cl.
*H04L 9/32* (2006.01)
*H04L 9/00* (2006.01)
*H04K 1/00* (2006.01)

(52) U.S. Cl. .................. 713/169; 713/183; 713/184; 726/5; 380/247; 380/33; 455/411

(58) Field of Classification Search ................ 713/170, 713/168, 169, 182–184, 200–202; 380/270, 380/33, 247–249; 455/410, 411; 726/5, 726/9
See application file for complete search history.

(56) References Cited

U.S. PATENT DOCUMENTS

| | | | |
|---|---|---|---|
| 5,668,876 A | | 9/1997 | Falk et al. |
| 6,097,817 A | * | 8/2000 | Bilgic et al. ............... 380/270 |
| 6,104,928 A | * | 8/2000 | Waugh ...................... 455/445 |
| 6,230,002 B1 | * | 5/2001 | Floden et al. .............. 455/411 |
| 6,430,407 B1 | * | 8/2002 | Turtiainen ................. 455/411 |
| 6,711,414 B1 | * | 3/2004 | Lightman et al. .......... 455/517 |
| 6,714,799 B1 | * | 3/2004 | Park et al. ................. 455/558 |
| 7,313,381 B1 | * | 12/2007 | Lemilainen et al. ........ 455/405 |
| 2002/0169958 A1 | * | 11/2002 | Nyman et al. .............. 713/168 |

FOREIGN PATENT DOCUMENTS

| | | |
|---|---|---|
| EP | 1075123 | 2/2001 |
| EP | 1075155 | 2/2001 |
| WO | 9944114 | 9/1999 |
| WO | 0002407 | 1/2000 |
| WO | 0044130 | 7/2000 |
| WO | WO 200044130 A1 * | 7/2000 |
| WO | WO 200058920 A1 * | 10/2000 |
| WO | 0184761 | 11/2001 |
| WO | 0219593 | 3/2002 |

* cited by examiner

*Primary Examiner*—Emmanuel L Moise
*Assistant Examiner*—Zachary A Davis
(74) *Attorney, Agent, or Firm*—Ware, Fressola, Van Der Sluys & Adolphson, LLP

(57) ABSTRACT

A client 110 may be authenticated by transmitting or beaming a telecommunication network subscriber's authentication to the client from a device 120, over a wireless link. For example, a GSM telephone 120 may authenticate an electronic book 110 to a content providing service within the Internet. The service verifies the authentication using the subscriber's GSM network operator's Authentication Center 161 to generate an authenticator and the client correspondingly generates a local copy of the authenticator using a GSM SIM over the wireless local link. The authentication is then determined by checking that these authenticators match and thereafter the authenticator can be used as a session key to encrypt data in the service.

42 Claims, 3 Drawing Sheets

AUTHENTICATION IN DATA COMMUNICATION

This is a continuation-in-part of application Ser. No. 09/858,264, filed May 14, 2001, titled "AUTHENTICATION IN DATA COMMUNICATION" now abandoned.

BACKGROUND

This invention relates to authentication in data communication. In particular the invention relates to, but is not limited to, authenticating mobile stations and network servers communicating with each other through a network.

The Internet is used to share public information. Since it is an open system, it should not be used to share confidential information unless precautions are taken to protect the information by use of passwords, encryption and the like. Even so, if passwords are used, hackers can determine them. In the Internet, there are clients, e.g. personal computers, and servers which may be server computers running computer programs that cause the servers to provide services to the clients. Typically computer programs used at clients and servers assume that their users are honest about their identity. Some client/server applications rely on the client to restrict its activities to those, which it is allowed to do, with no other enforcement by the server. Both clients and servers are entities.

Some sites use firewalls to improve their network security. Unfortunately, firewalls are based on an assumption of security threats come from the outside, which is not always the case. Computer crime can be carried out by insiders who have access to such private networks that are connected to the Internet by firewalls, that is intranets. These insiders can listen to the data traffic and detect passwords of the other users. Using these illegally obtained passwords, an insider can access such services to which he would not normally have access. In other words, firewalls can restrict viruses from accidentally contaminating an intranet, but they do not generally provide any certainty of the true authenticity of a client or server. Strong authentication is highly desirable for transactions involving money, confidential data or both.

One way to improve the situation is to use dedicated authentication protocols and, if necessary, encryption protocols for verifying the authenticity of a party and for preventing unauthorised parties from obtaining access. In addition, these protocols can typically be used to verify the integrity of any information exchanged over a link so that a recipient can be certain that the data received have not been tampered with.

The wireless use of a Subscriber Identity Module SIM is previously known in the context of lending a SIM from one mobile station to another mobile station. EP1075155 discloses an example of providing a wireless access to a SIM, in order to provide a user identity of a GSM device. One SIM can be alternately used by different GSM devices without physically transferring the SIM between these devices. This publication is referred to as an example on how a SIM can be accessed over a wireless link, although there one SIM is shared by two mobile stations.

WO 00/02407 discloses an invention wherein a laptop PC, provided with a Wireless Local Area Network (WLAN) adapter and a Global System for Mobiles (GSM) card phone, may access WLAN networks and authenticate a user by utilising a Subscriber Identity Module (SIM) card contained by the GSM card phone. Access to the local area network takes place e.g. with the aid of a LAN card in the terminal and to the GSM network with the aid of a GSM card phone, which in practice is a stripped telephone located e.g. in the laptop's expansion slot. In addition, a SIM is connected to the GSM card phone. In that publication, the SIM is used not only for authenticating in a GSM network, but for reliable authentication of a data terminal to a non-trusted data network, such as to a third-party Mobile Internet Protocol (MIP) network. The SIM is accessed using the SIM slot of the GSM card phone. In brief, the SIM is used for generating a correct response to a challenge originated from an Authentication Center (AuC) of the GSM network to which the SIM belongs. The response can only be correctly generated by the SIM that possesses a first shared secret or a secret key known or stored only by the SIM and the AuC. When a user desires to access a WLAN network, a following process is performed:

1. A Home agent (HA) fetches from the authentication center AuC located in connection with the home location register HLR of the mobile communications network a set of subscriber-specific authentication triplets, each of which contains a challenge or RAND, a signed response (SRES) and a GSM key, Kc, which is a connection-specific encryption key.

2. The challenge (RAND) in each authentication triplets are transferred further to the mobile node or terminal.

3. The terminal uses the SIM to generate a response and a GSM key, Kc, based on one of the challenges and a first shared secret, KI known only by the SIM and the AuC.

4. The terminal sends back the response to the HA for checking against the HA stored version of the response. Security Parameter Index (SPI) is used for carrying the SRES, and because some of the SPI values are received, they cannot be used. Therefore, the response not only acknowledges that the terminal has access to the SIM, but also identifies which one of many challenges has been used and corresponding GSM key, Kc, can be used.

5. The obtained GSM key, Kc, is used as a secret, the basis of which an authenticator is computed. The authenticator may be used as a session key in, for example, Mobile IP networking.

Despite the technical advance of WO 00/02407, it still necessitates a data terminal to possess a SIM slot in order to be able to make use of the disclosed SIM based authentication. Furthermore, althouth a user may have separate SIMs for a personal GSM telephone and for a GSM card phone of a personal computer, he or she may only have or desire to use a single SIM alternately in either device.

The use of the word 'known' is synonymous with the word store. A device 'knows' information if the device stores that information in one or more registers or memories that are on, in or near a processor of the device in the sense that the information is readable or operable by the processor in a manner that is not susceptible to interception or corruption. Knowing has a time-factor as well. A first device may not know information during a brief instant, where one or more exchanges of messages between the device and a second device are required before the data of a second device is readable or operable by a processor of the first device, and yet the first device may know the information in the context of a larger period of time.

SUMMARY OF THE INVENTION

According to a first aspect of the invention there is provided a method of authenticating a client to a communications system, comprising the steps of:

retrieving from a subscriber identity module a subscriber identity corresponding to a subscriber of a mobile telecommunications network, wherein the mobile telecommunications network is separate from the communications system to which the client is to be authenticated;

sending the subscriber identity to an authentication block of the mobile telecommunications network;

receiving from the authentication block at least one challenge and at least one first secret based on a subscriber's secret specific to the subscriber identity;

sending the at least one challenge to the subscriber identity module;

receiving at least one second secret in response to the at least one challenge; and using the second secret for authenticating the client; characterised in that the subscriber identity module is accessed over a local wireless link when retrieving the subscriber identity.

It is an advantage of the method that the extensive installed base of subscriber identification modules (e.g. GSM SIMs) can be readily used for authenticating each user in another communication system over a local wireless link. This enables a user to authenticate himself by using his/her own subscriber identity module without separately installing it into a terminal being used for accessing that communication system. Preferably, the first secret is a signed response (for example, SRES in GSM) produced at the authenticating block. Preferably, the second secret is a signed response produced by the subscriber identity module. Preferably, the subscriber's secret is a secret known only by the subscriber identity module and the authentication block (for example, Ki in GSM). The term separate refers to the fact that the communication system is or can be operated by a different vendor than the mobile telecommunications network. Typically, the communication system uses a different access point or access points for connecting with the client, whereas the mobile telecommunications network has base transceiver stations for connecting with its subscribers.

The 'knowing of information' refers to having an access to the information. A device 'knows' information if the device stores that information in one or more registers or memories that are on, in or near a processor of the device in the sense that the information is readable or operable by the processor in a manner that is not susceptible to interception or corruption, or if the device can access the information otherwise on demand. Knowing has a time-factor as well. A first device may not know information during a brief instant, where one or more exchanges of messages between the device and a second device are required before the data of a second device is readable or operable by a processor of the first device, and yet the first device may know the information in the context of a larger period of time.

Preferably, the testing the authenticating by means of the second secret comprises the sub-step of comparing the second secret with the first secret.

Preferably, the local wireless link is selected from the group consisting of: a Low-Power Radio-Frequency (LPRF) link, such as a Bluetooth link, an optical link, such as an infrared link, and an acoustic link such as an ultrasound link. Typically, the range of the local wireless link is up to about 10 meters, which may vary according to sensitivity of antennas, positioning of devices in nulls, and other environmental factors. The accessing of the subscriber identity module over the local wireless link allows greatly enhanced flexibility by bringing subscriber identity module based authentication to devices that lack a subscriber identity module reader. For example, laptop computers commonly have an Infrared Data Association (IRDA) port which supports a local wireless link. In addition local wireless connectivity is expected soon in a number of different Bluetooth enabled mobile telephones and laptop PC adapters.

Preferably, a subscriber identity module-containing device is provided with a wireless transceiver for providing said wireless access to the subscriber identity module. Such a device may be, for example, a mobile telephone such as a GSM telephone, an UMTS (3rd generation mobile telephone), or a GSM data adapter for a computer.

Preferably, the method further comprises the step of generating an authenticator to authenticate the use of a personal service. The generation of the authenticator may separate the ciphering used by the mobile telecommunications network from the key being used in obtaining services so as to reduce the risk of the mobile telecommunication network's ciphering becoming hacked open.

Preferably, the authenticator is derived using at least one item selected from the group consisting of: the first secret, the second secret, a replay attack protection code and a mobile telecommunications key. Preferably, the mobile telecommunications key is a GSM key (Kc). Preferably, if the client has an access to a correct subscriber identity module, the first and second secrets are the same. Alternatively, another or both of the first and second secrets may be different derivatives of a portion of data producible by using the challenge.

Preferably, the method further comprises the steps of:

inputting a personal identity code from a user to the client; and providing the personal identity code to the subscriber identity module over the local wireless link.

This provision of the personal identity code (e.g. a personal identity number, PIN) to the subscriber identity module by using the local wireless link removes the need of a user to enter the personal identity code by the subscriber identity module containing device. It suffices for a user to operate only one device, and the subscriber identity module containing device can be remotely operated. This is particularly advantageous if the local wireless link allows use of the subscriber identity module containing device when enclosed in a pocket or a briefcase, as then the user needs not first pick the device and then possibly open it, if it is locked by a password.

Preferably, the method further comprises encrypting the PIN before providing it to the subscriber identity module over the local wireless link.

Preferably, the method further comprises encrypting the second secret before providing it from the subscriber identity module to the client.

According to a second aspect of the invention there is provided a method of authenticating a client to a communications system using a subscriber identity module of a mobile telecommunications network, wherein the communications system is separate from the mobile telecommunications network, the method comprising the following steps at a device containing the subscriber identity module:

retrieving from a subscriber identity module a subscriber identity corresponding to a subscriber of a mobile telecommunications network;

sending the subscriber identity to a client over a local wireless link for authenticating the client to the communications system;

receiving over the local wireless link from the client at least one challenge based on a subscriber's secret specific to the subscriber identity;

providing the at least one challenge to the subscriber identity module and in response to the challenge receiving at least one authentication secret; and sending the at least one authentication secret over the local wireless link to the client.

Preferably, the method further comprises the step of receiving over a local wireless link a request for initiating the method, and the method is performed in response to the request.

Preferably, the request further comprises a personal identity code for authorising the use of the subscriber identity module. Preferably, the correctness of the personal identity code is checked prior to the sending the subscriber identity.

Preferably, the authentication secret corresponds to the second secret of the first aspect.

According to a third aspect of the invention there is provided a client to a communications system, comprising:
- a first interface for retrieving from a subscriber identity module a subscriber identity corresponding to a subscriber of a mobile telecommunications network, wherein the mobile telecommunications network is separate from the communications system to which the client is to be authenticated;
- a second interface for sending the subscriber identity to an authentication block of the mobile telecommunications network and for receiving from the authentication block at least one challenge and at least one first secret based on a subscriber's secret specific to the subscriber identity; and
- the first interface being configured for sending the at least one challenge to the subscriber identity module and for receiving at least one second secret in response to the challenge;
- characterised in that the first interface is adapted for communications over a local wireless link when retrieving the subscriber identity.

Preferably, the client is selected from a group consisting of: a portable computer, a Personal Digital Assistant, a digital book, a digital paper, a digital network browser, a digital news reader, a digital mail terminal, a digital gaming device and a digital calendar.

Preferably, the at least one second secret is used for authenticating the client to use a data service.

Preferably, the data service is selected from a group consisting of: delivery of information, accessing a data network, ordering electric services such as digitally presented visual and/or acoustic content, electric banking, electric conferencing and electric chatting.

According to a fourth aspect of the invention there is provided a device for authenticating a client to a communications system using a subscriber identity module of a mobile telecommunications network, wherein the communications system is separate from the mobile telecommunications network, the device comprising:
- an interface for communicating with the subscriber identity module, configured for retrieving from a subscriber identity module a subscriber identity corresponding to a subscriber of a mobile telecommunications network;
- a transmitter for sending the subscriber identity to a client over a local wireless link for authenticating the client to the communications system and for receiving over the local wireless link from the client at least one challenge based on a subscriber's secret specific to the subscriber identity;
- the interface further being configured for providing the at least one challenge to the subscriber identity module and in response to the challenge receiving at least one authentication secret; and
- the transmitter being configured for sending the at least one authentication secret over the local wireless link to the client.

Preferably, the device further comprises a receiver for receiving over a local wireless link a request for authenticating the client and the transmitter is further configured for sending the subscriber identity to a client in response to the request.

Preferably, the device is a mobile telecommunications device. Even more preferably, the device is a mobile telephone.

According to a fifth aspect of the invention there is provided an authentication system, comprising a client to a communications system and a device for communicating with a subscriber identity module to the communications system using a subscriber identity module of a mobile telecommunications network, wherein the communications system is separate from the mobile telecommunications network, the client comprising:
- a first interface for retrieving wirelessly from a subscriber identity module a subscriber identity corresponding to a subscriber of a mobile telecommunications network, wherein the mobile telecommunications network is separate from the communications system to which the client is to be authenticated;
- a second interface for sending the subscriber identity to an authentication block of the mobile telecommunications network and for receiving from the authentication block at least one challenge and at least one first secret based on a subscriber's secret specific to the subscriber identity;
- the first interface being configured for sending the at least one challenge to the subscriber identity module and for receiving at least one second secret in response to the challenge; and the device for communicating with a subscriber identity module comprising:
a third interface for communicating with the subscriber identity module, configured for retrieving from a subscriber identity module a subscriber identity corresponding to a subscriber of a mobile telecommunications network;
- a transmitter for sending the subscriber identity to a client over a local wireless link for authenticating the client to the communications system and for receiving over the local wireless link from the client at least one challenge based on a subscriber's secret specific to the subscriber identity;
- the third interface further being configured for providing the at least one challenge to the subscriber identity module and in response to the challenge receiving at least one authentication secret; and
- the transmitter being configured for sending the at least one authentication secret over the local wireless link to the client.

According to a sixth aspect of the invention there is provided a computer program product for controlling a client in order to authenticate the client to a communication system by using a subscriber identity module of a mobile telecommunications network, wherein the mobile telecommunications network is separate from the communications system to which the client is to be authenticated; the computer program product comprising:
- computer executable program code to enable the client to retrieve from a subscriber identity module a subscriber identity corresponding to a subscriber of a mobile telecommunications network;
- computer executable program code to enable the client to send the subscriber identity to an authentication block of the mobile telecommunications network;

computer executable program code to enable the client to receive from the authentication block at least one challenge and at least one first secret based on a subscriber's secret specific to the subscriber identity;

computer executable program code to enable the client to send the at least one challenge to the subscriber identity module;

computer executable program code to enable the client to receive at least one second secret in response to the at least one challenge; and computer executable program code to enable the client to use the second secret for authenticating the client; characterised in that the subscriber identity module is accessed over a local wireless link when retrieving the subscriber identity.

According to a seventh aspect of the invention there is provided a computer program product for controlling a device for authentication a client to a communications system using a subscriber identity module of a mobile telecommunications network, wherein the communications system is separate from the mobile telecommunications network, the computer program product comprising:

computer executable program code to enable the device to retrieve from a subscriber identity module a subscriber identity corresponding to a subscriber of a mobile telecommunications network;

computer executable program code to enable the device to send the subscriber identity to a client over a local wireless link for authenticating the client to the communications system;

computer executable program code to enable the device to receive over the local wireless link from the client at least one challenge based on a subscriber's secret specific to the subscriber identity;

computer executable program code to enable the device to provide the at least one challenge to the subscriber identity module and receiving at least one authentication secret in response to the challenge; and computer executable program code to enable the device to send the at least one authentication secret over the local wireless link to the client.

The embodiments of one aspect also apply to various other aspects of the invention. In sake of brevity, the embodiments have not been repeated in connection with every aspect of the invention. A skilled reader will appreciate the advantages of the various aspects based on the advantages of the first aspect of the invention.

BRIEF DESCRIPTION OF THE DRAWINGS

The invention will now be described, by way of example only, with reference to the accompanying drawings, in which.

DETAILED DESCRIPTION

The term separate refers to the fact that a first communication system is or can be operated by a different vendor, provider or carrier than a second communication system. Typically, the first communication system may use a different access point or access points for connecting with the client, whereas the second communication system may have base transceiver stations for connecting with its subscribers. Two communication systems may also be separate in the sense that each has a separate authentication system or firewall that is centrally managed by different servers.

The secret of a SIM is said to be corresponding to a shared secret of a mobile telecommunication system if the mobile station has been provisioned to operate on the mobile telecommunication system, wherein the secret exists as a copy in an authentication block of the mobile telecommunication system.

Figure 1:
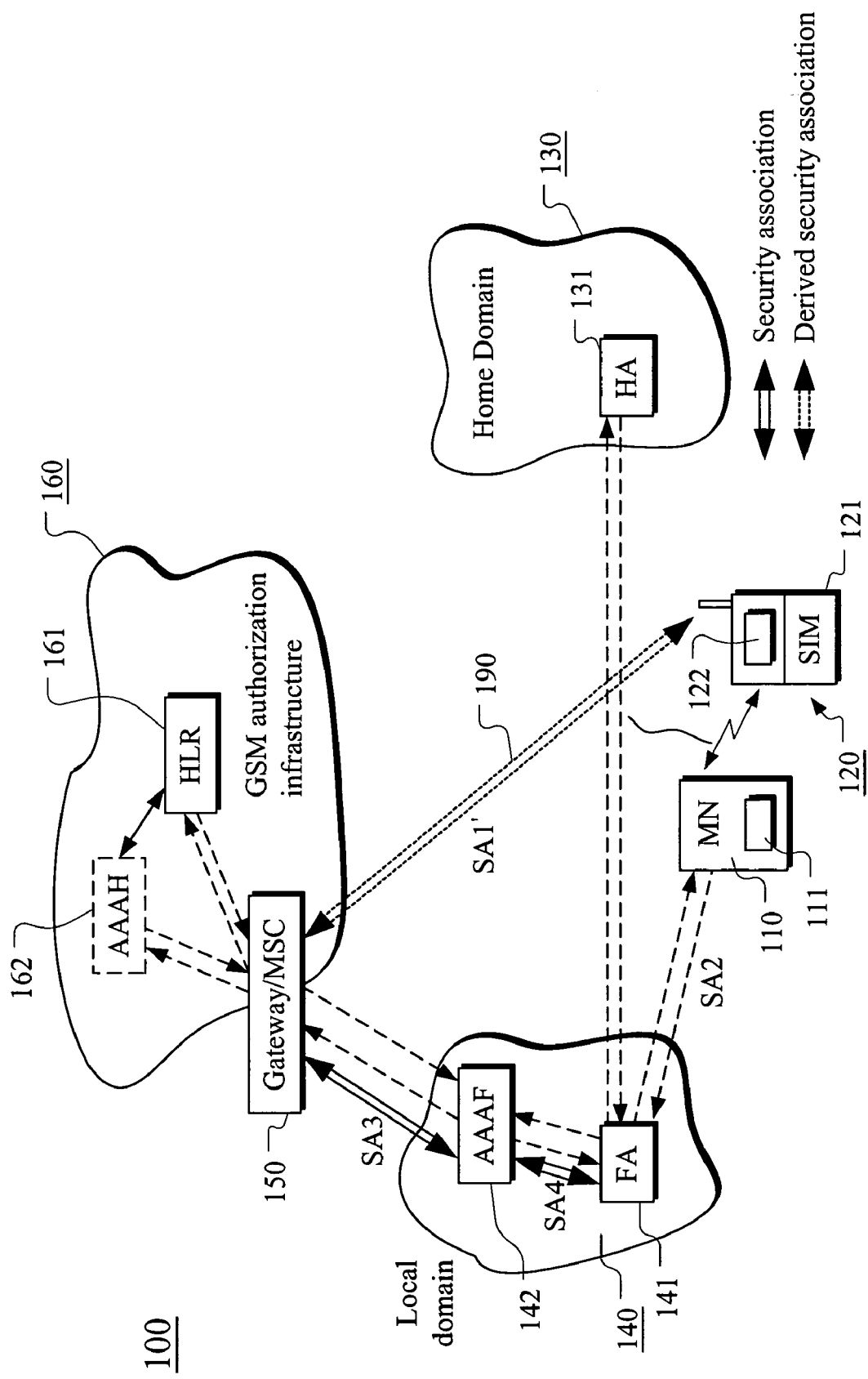
FIG. 1 shows an embodiment in a communication system and a mobile telecommunications network which may be used by an embodiment.

FIG. 1 shows a communication system 100 comprising a mobile telecommunications network 160, e.g. GSM, and a communication network, e.g. mobile internet protocol (MIP) network, containing a visited local domain 140 and a home domain 130. The system 100 further comprises a client, or Mobile Node, 110, which may communicate via an access point of the MIP network. The system additionally has a mobile station 120, e.g. a GSM telephone that may access the telecommunication network 160 through a base station. The mobile station 120 comprises a subscriber identity module (SIM) 121 in a SIM slot and a user interface 122. The home domain 130 comprises a home agent (HA) 131 that controls the access of the client 110 to other networks. For example, the home agent 131 may keep record of care-of (c/o) addresses to be used for granting clients access to visited visiting foreign domains, such as the local domain 140. The local domain 140 comprises a foreign agent that provides a c/o address to the client 110 and that the client can use as a proxy to access other networks and services. The local domain 140 further comprises a foreign Authentication, Authorisation, and Accounting block 142, (AAAF). The AAAF 142 may be accessed by the FA 141 and further has an access to the mobile telecommunication network 160 via a gateway 150. The telecommunications network 160 further comprises a home AAA (AAAH) block 162 for the client 110 and a Home Location Register (HLR) 161 having capability of an Authentication Centre (AuC). The gateway 150 allows communication between the AAAF 142 and the AAAH 162. One or more of the gateway 150, the HLR 161 and the AAAH 162 may comprise the authentication block.

The client 110 may be a device having an interface with a data network (see FIG. 4), for example the Internet. The client 110 may be, for example, a laptop computer capable of communicating with a Local Area Network, Mobile IP network or Bluetooth network. The communications between the client 110 and the data network may use wireless signals such as Low Power Radio Frequency, e.g. Bluetooth communications, light signals, e.g. infrared beams, or acoustic signals e.g. ultrasound. A client 110 may be, for example, an electronic book, an electronic gaming device, or a Personal Digital Assistant (PDA) device. The client has a user interface 111 for outputting and inputting data to and from its user.

FIG. 1 also illustrates the different communications paths used for authenticating the client 110 and correspondingly generating an authenticator for a service. Each path may be a wireless link that occurs by radio frequencies, optical frequencies or sound. Single dashed lines show the paths used for authenticating and double lines show the security associations formed during the authentication process. Additionally, a security association 190 exists between the mobile station 121 and the gateway 150. This security association represents the authorization that may be made between a mobile station and a mobile telecommunications network if the mobile station is used normally, for example for making a mobile telephone call. The gateway 150 may operate as a Mobile Services Switching Center (MSC).

It is worth noting that all the blocks 131, 141, 142, 162 and 161 are typically implemented by means of software and servers located in various networks. These blocks can alternatively be distributed virtually anywhere around the world.

Figure 2:
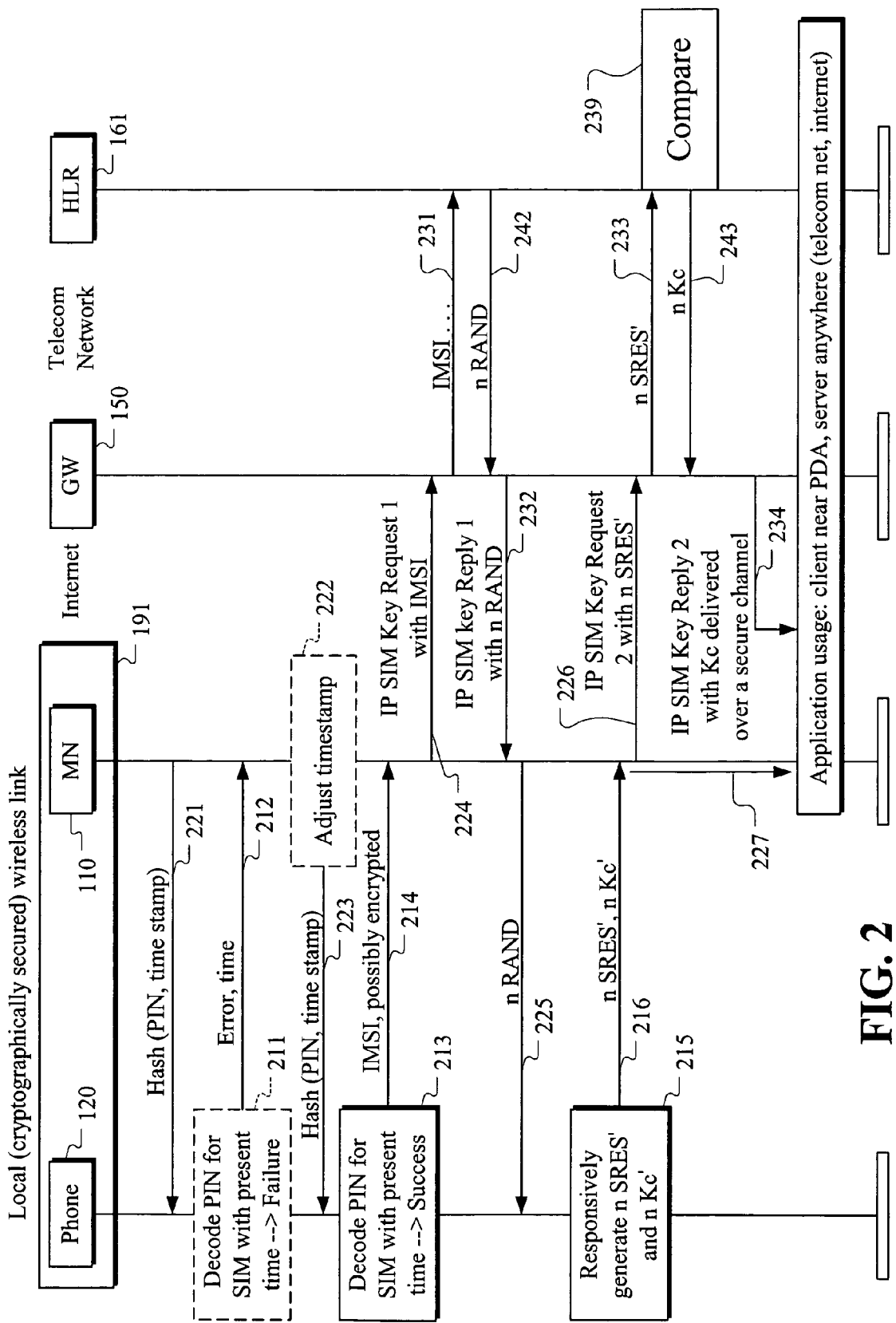
FIG. 2 shows a procedure in accordance with the preferred embodiment.

FIG. 2 shows a procedure starting from a situation in which a user positions a client 110 near a mobile station 120 containing a SIM 121 that the user is entitled to use. The user knows a personal identification number (PIN). A user starts the authentication process of an embodiment by entering, by way of the user interface 111, the PIN to the client 110. The client 110 may then encrypt the PIN by using a random replay attack protection coding such as a one-way hash function, wherein the PIN and a time stamp are encrypted so that a resultant coded signal is decryptable by the mobile station 120. When the client sends either the PIN or an encrypted PIN, the client is sending a request. The coded signal or encrypted PIN may be then sent over a local wireless link 191 to the mobile station 120, step 221.

A mobile station 120 may receive the request. The mobile station 120 may decode or decrypt the request if it contains an encrypted PIN and check 211 whether the PIN of the request correctly matches a PIN stored on the SIM. Errors may be caused if the mobile station 120 and the client 110 are not synchronized with the same time. In which case the mobile station 120 may send an error message 212 indicating that the time stamp should be verified. The client 110 may adjust the time stamp 222 and may send a second encrypted PIN 223. The mobile station 120 may receive the second encrypted PIN and may calculate whether it is correct for the SIM 213. If yes, then the procedure may continue. Either the checking step 211 or the calculating step 213 may retrieve a subscriber identity from the subscriber identity module, providing in either step, that the PIN received at the mobile station 120 is correct for the PIN stored in the SIM. The subscriber identity may correspond to a subscriber of a mobile telecommunications network. The mobile station 120 may confirm that the PIN of the request matches an identity module PIN by way of either the checking step 211 or the calculating step 213, for example.

Next, the mobile station 120 may send its subscriber identity 214, typically an international mobile subscriber identity (IMSI). The IMSI may be sent in encrypted form. Alternatively a subscriber identity that is an index corresponding to the IMSI may be sent to the client 110 if the client 110 or any entity accessible to it has a mapping between the index and the IMSI. Such a mapping is useful in the sense that it conceals the IMSI by refraining from transmitting the IMSI over the local wireless link 191. Thus the risk is lowered that a third party captures and decrypts the IMSI.

Now that the client 110 knows the IMSI or its equivalent, client 110 may send 224 an IP SIM Key Request 1 with the IMSI to the gateway 150. The gateway 150 may forward 231 the IMSI to the HLR 161. The HLR 161 may generate a number of authentication triplets, e.g. GSM triplets, typically in amounts up to three triplets. The HLR 161 then replies 242 with a predetermined number (n) of challenges, e.g. RANDs, to the gateway 150. The gateway 150 may send 232 an IP SIM key Reply 1 with n challenges to the client 110.

After receiving the challenges, the client 110 should prove its authorisation to act as a person whose identity the SIM possesses. The client 110 may access the SIM again by sending 225 the n challenges to the mobile station 120. The mobile station may then generate 215 at least one first secret, which may include n signed responses (SRES'). The at least one first secret may comprise GSM keys, e.g. mobile telecommunications keys, Kc', by using its SIM. The copies of the signed responses and GSM keys generated by the SIM are locally produced copies and as they might differ from those generated by the HLR, if the SIM was wrong, a notation SRES' and Kc' is used respectively. The mobile station 120 then sends 216 these challenges and at least one first secret to the client 110.

The first secret may include one or more signed responses, e.g., the GSM specified signed Response (SRES). The secret specific to the subscriber identity is a secret known only by the subscriber identity module and the authentication block. One such example of a secret specific to the subscriber identity is the GSM specified Ki.

The client may receive the at least one first secret and GSM keys that the mobile station may send 216. The client 110 only needs to have the at least one first secret verified by the HLR 161 before the client 110 can form an authentication key for using a desired service. The client 110 sends 226 the at least one first secret to the gateway 150 in an IP SIM Key Request 2. The gateway 150 may forward 233 the at least one first secret to the HLR 161, which compares 239 the at least one first secret against at least one second secret, e.g. the secret generated at the HLR or Kc. If comparison 239 indicates they match, the SIM used must be correct. After the HLR 161 determines that the SIM is correct, the HLR 161 may reply to the gateway 150 by sending 243 the second secret, which may be GSM keys, e.g. n Kc. The gateway 150 sends 234 these GSM keys to the HA 131 via the FA 141 (see FIG. 1). The FA may then grant access to the desired service for the client when the client 110 proves its identity using 227 the at least one second secret, e.g. the secret generated at the HLR or Kc.

The grant of access by a communication network to a client typically involves generation of an authenticator which may be an encrypted message based on, e.g., the at least one second secret. The at least one second secret may be encrypted by a one-way hash function of the GSM keys and of a time stamp or a replay attack protector as known in the art. The replay attack protector is typically a random number generated by the client 110. In order to use the same replay attack protector in the generation of the authenticator, the client 110 may send a replay attack protector to the FA 141, typically in the IP SIM Key request 1, step 224, which may pass through the FA 141. Alternatively, an authenticator may be based on one or more Kc, e.g. an encrypted Kc. Authenticator factors may be the at least one first secret and the at least one second secret, to the extent the authenticator is based upon the GSM keys or at least one second secret The desired service may be any personal or otherwise limited access service. Such services include, voice communications (e.g. voice over IP), email, instant messaging, e-commerce. In addition, text chat, voice chat, prepaid or account based access on the Internet, personal address book hosting, personal calendar hosting, may be desired services. Desired services may include access to a restricted access file system, e.g. a corporate file system, or access to a restricted access data network, e.g. a corporate intranet. Desired services may also include, access to a restricted access database, e.g. a corporate data base, access to a MIP network, or access to a Wireless Local Area Network WLAN.

The authenticator may be valid for a predetermined time period, or it may be otherwise re-generated while a service is being used. According to alternative embodiments, an expired authenticator may be used until the use of a desired service ends. Alternatively a home domain may require that a new authenticator be generated on expiration of the previous authenticator, before the use of the service can be continued. The process for obtaining a new authenticator may be the same as described in connection with FIG. 2. Alternatively, the process starts from step 224, if the client has stored the identity of the identity module and if the same device (mobile telephone) is used to transmit the authentication to the client. In this case the PIN code need not be re-sent over the local wireless link merely for refreshing the authenticator and the authenticator can be refreshed automatically without user interaction.

The above-described process of obtaining an identity from a subscriber identity module and of further accessing the SIM for further generation of responses and keys may be referred to as beaming. The SIM capability may be beamed to the client 110 for an authentication purpose. The mobile station 120 carrying the SIM need not be switched off. Moreover, the mobile station 120 may be configured such that it can perform the beaming even while being used, e.g. for voice transmission or reception.

While the preferred embodiment as described was based on comparing the secrets provided by the AuC and by the SIM, the subscriber identity module access may be combined with other subscriber identity module based authentication procedures and protocols. For example, the a SRES may be replaced with one-way hashed codes as alternative secrets. The different embodiments of the invention may be scaleable to any particular subscriber identity module based authentication of a client to a communication system separate from the telecommunication network to which that module actually belongs. The subscriber identity module may be such a device that it can produce a response and a key corresponding to a challenge in a manner such that unauthorised third parties cannot easily detect. A GSM SIM is a good example of such, but the subscriber identity modules for various other purposes can equally be used, provided an access and co-operation can be arranged with the respective Authentication center in order to obtain relevant challenges, responses and keys.

Figure 3:
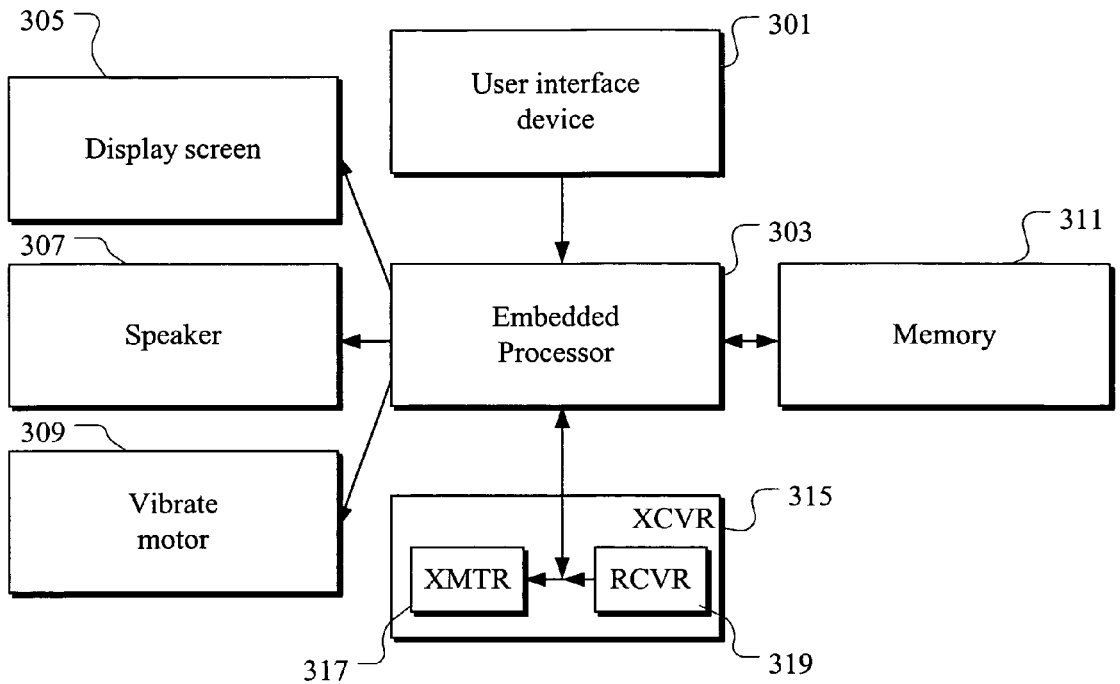
FIG. 3 shows a block diagram of a mobile station according to an embodiment.

FIG. 3 shows a block diagram of a communication device that may carry out the functions and equivalents described herein, such as, e.g. those functions of a mobile station shown in FIG. 2. A user interface device 301 receives inputs. Such inputs may be associated with characters, symbols and functions. The character-entry device may depend on pressure, e.g. such as to a keypad to take character and other inputs. Character-entry device may provide characters and other inputs encoded by means known in the art to an embedded processor 303. Embedded processor 303 may provide outputs that are discernable to human beings in several forms, including visual displays, audio, and vibrations, which may be provided by a display screen 305, speaker 307 and vibrate motor 309 respectively. Processor 303 may store and retrieve information from memory 311. Memory 311 may be pre-programmed with data and instructions. Such instructions may include computer executable program code to enable the device to provide the at least one challenge to the subscriber identity module and receiving at least one authentication secret in response to the challenge. Memory 311 may include a removable media such as a SIM. Communication device may be able to communicate with other devices through a transceiver 315. Transceiver 315 may be able to transmit and receive signals as electromagnetic signals or sound. At a minimum, transceiver 315 may be a transmitter 317. Transceiver may also include a receiver 319. A mobile station may have multiple transmitters and receivers. Some transmitters may have an effective range that is long range. Some transmitters may have an effective range that is short range, or local.

Figure 4:
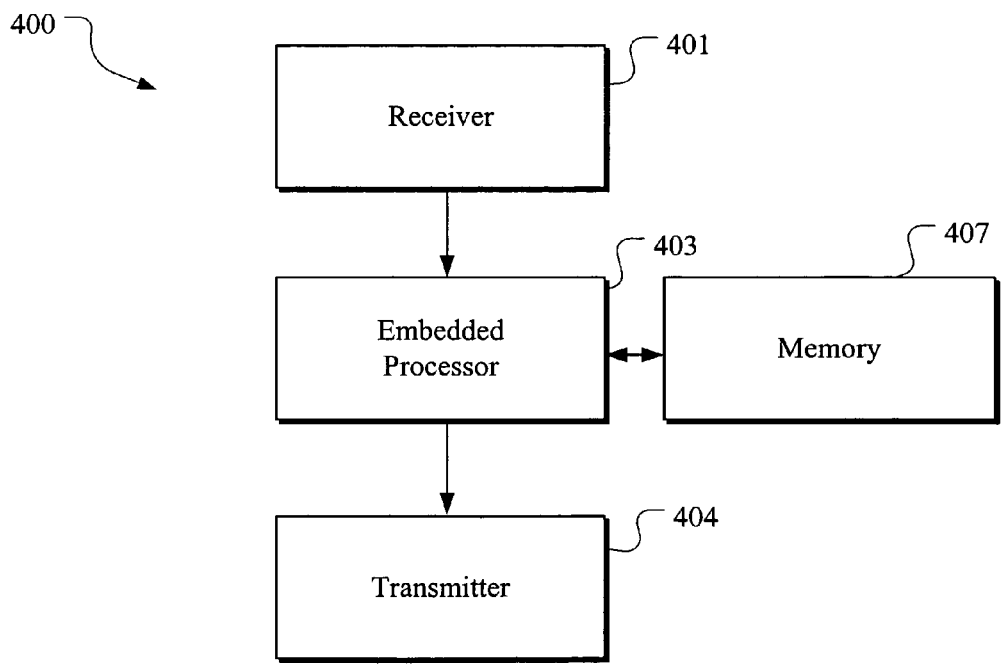
FIG. 4 shows a block diagram of a client according to an embodiment.

FIG. 4 shows an apparatus that may provide the functions of a client, e.g. as described in FIG. 2. Client 400 may be comprised of a receiver 401, providing data signals to an embedded processor 403. Embedded processor may communicate by wireless through transmitter 404. Transmitter and receiver may operate alone, or in coordination to beam information to and from the client 400. In addition, processor 403, may rely on memory 407.

Particular implementations and embodiments of the invention have been described. While IP networks have been used to exemplify the invention, various other types of data networks are similarly applicable. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
receiving at a mobile client a subscriber identity sent from a mobile station comprising a subscriber identity module, the subscriber identity corresponding to a subscriber of a mobile telecommunication network, wherein the mobile telecommunication network is separate from a communication system to which the mobile client is to be authenticated, and wherein the mobile station is separate from the mobile client;
sending the subscriber identity from the mobile client to an authentication block of the mobile telecommunication network;
receiving at the mobile client from the authentication block at least one challenge and at least one first secret based on a subscriber's secret specific to the subscriber identity;
sending from the mobile client the at least one challenge to a subscriber identity module;
receiving at the mobile client at least one second secret in response to the at least one challenge; and
using the second secret for authenticating the mobile client to the communication system separate from the mobile telecommunication network.

2. The method according to claim 1 further comprising:
receiving a personal identification number from a user; and
transmitting wirelessly the personal identification number to the mobile station.

3. The method according to claim 2 further comprising:
encrypting the personal identification number before transmitting the personal identification number.

4. The method according to claim 1 wherein using the second secret further comprises:
encrypting the second secret to provide an encrypted second secret; and
transmitting the encrypted second secret to the communication system.

5. The method according to claim 4 wherein using the second secret further comprises:
refreshing the encrypted second secret.

6. The method according to claim 1 wherein sending the subscriber identity to the authentication block comprises sending wirelessly the subscriber identity to the authentication block; and
wherein receiving from the authentication block comprises receiving wirelessly from the authentication block.

7. The method according to claim 1 wherein:
receiving from the mobile station the subscriber identity comprises receiving wirelessly from the mobile station the subscriber identity;
sending the at least one challenge comprises sending wirelessly the at least one challenge; and receiving at least one second secret comprises receiving wirelessly at least one second secret.

8. The method according to claim 7 further comprising:
receiving a personal identification number from a user; and
transmitting wirelessly the personal identification number to the mobile station.

9. The method according to claim 8 wherein transmitting wirelessly comprises transmitting an infrared signal.

10. The method according to claim 8 wherein transmitting wirelessly comprises transmitting a radio signal.

11. The method according to claim 8 wherein transmitting wirelessly comprises transmitting a low power radio signal.

12. The method according to claim 8 wherein transmitting wirelessly comprises transmitting an acoustic signal.

13. The method of claim 1, further comprising sending the subscriber identity from the mobile client to the authentication block via the communication system.

14. An apparatus, comprising:
a means for receiving at a mobile client a subscriber identity sent from a mobile station comprising a subscriber identity module, the subscriber identity corresponding to a subscriber of a mobile telecommunication network, wherein the mobile telecommunication network is separate from a communication system to which the mobile client is to be authenticated, and wherein the mobile station is separate from the mobile client;
a means for sending the subscriber identity to an authentication block of the mobile telecommunication network;
a means for receiving at the mobile client from the authentication block at least one challenge and at least one first secret based on a subscriber's secret specific to the subscriber identity;
a means for sending from the mobile client the at least one challenge to a subscriber identity module; and
a means for receiving at the mobile client at least one second secret in response to the at least one challenge wherein the second secret is arranged to be used for authenticating the mobile client to the communication system separate from the mobile telecommunication network.

15. The apparatus according to claim 14 further comprising:
a means for receiving a personal identification number from a user; and
a means for transmitting wirelessly the personal identification number to the mobile station.

16. A method comprising:
retrieving from a subscriber identity module in a mobile station a subscriber identity corresponding to a subscriber of a mobile telecommunication network;
sending wirelessly the subscriber identity from the mobile station to a mobile client for authenticating the mobile client to a communication system separate from the mobile telecommunication network;
receiving wirelessly at the mobile station from the mobile client at least one challenge based on a subscriber's secret specific to the subscriber identity;
generating at the mobile station at least one secret in response to the at least one challenge; and
sending from the mobile station wirelessly to the mobile client the at least one secret.

17. The method of claim 16 wherein the method further comprises wirelessly receiving a request.

18. The method of claim 17 wherein the request contains a personal identification number.

19. The method of claim 18 further comprising confirming that the personal identification number matches a identity module personal identification number.

20. The method of claim 17 wherein the request contains an encrypted personal identification number.

21. An apparatus, comprising:
means for retrieving from a subscriber identity module a subscriber identity corresponding to a subscriber of a mobile telecommunication network;
means for sending wirelessly the subscriber identity to a mobile client for authenticating the mobile client to a communication system separate from the mobile telecommunication network;
means for receiving wirelessly from the mobile client at least one challenge based on a subscriber's secret specific to the subscriber identity;
means for generating at least one secret in response to the at least one challenge and
means for sending wirelessly the at least one secret.

22. The apparatus of claim 21, further comprising a means for wirelessly receiving a request.

23. A computer program product embodied in a computer readable medium for controlling a client in order to authenticate the client to a communication system by using a subscriber identity module of a mobile telecommunications network, wherein the mobile telecommunications network is separate from the communications system to which the client is to be authenticated; the computer program product comprising:
computer executable program code to enable the client to wirelessly retrieve from a subscriber identity module of a mobile station a subscriber identity corresponding to a subscriber of a mobile telecommunications network;
computer executable program code to enable the client to wirelessly send the subscriber identity to an authentication block of the mobile telecommunications network;
computer executable program code to enable the client to wirelessly receive from the authentication block of the network at least one challenge and at least one first secret based on a subscriber's secret specific to the subscriber identity;
computer executable program code to enable the client to wirelessly send the at least one challenge to the subscriber identity module;
computer executable program code to enable the client to wirelessly receive from the mobile station at least one second secret in response to the at least one challenge; and
computer executable program code to enable the client to use the second secret for authenticating the client to the communication system separate from the mobile telecommunication network, wherein the subscriber identity module is accessed over a local wireless link between the mobile station and the client when wirelessly retrieving the subscriber identity from the mobile station.

24. A computer program product embodied in a computer readable medium for controlling a device for authenticating a client to a communications system using a subscriber identity module of a mobile telecommunications network, wherein the communications system is separate from the mobile telecommunications network, the computer program product comprising:
computer executable program code to enable the device to retrieve from a subscriber identity module a subscriber identity corresponding to a subscriber of a mobile telecommunications network;

computer executable program code to enable the device to send the subscriber identity to a client over a local wireless link for authenticating the client to the communications system separate from the mobile telecommunications network;

computer executable program code to enable the device to receive over the local wireless link from the client at least one challenge based on a subscriber's secret specific to the subscriber identity;

computer executable program code to enable the device to provide the at least one challenge to the subscriber identity module and receiving at least one authentication secret in response to the challenge; and computer executable program code to enable the device to send the at least one authentication secret over the local wireless link to the client for use by the client in said authenticating the client to the communications system.

25. An apparatus, comprising:
a first module for receiving at a mobile client a subscriber identity sent from a mobile station comprising a subscriber identity module, the subscriber identity corresponding to a subscriber of a mobile telecommunication network, wherein the mobile telecommunication network is separate from a communication system to which the mobile client is to be authenticated, and wherein the mobile station is separate from the mobile client;
a second module for sending the subscriber identity to an authentication block of the mobile telecommunication network;
a third module for receiving at the mobile client from the authentication block at least one challenge and at least one first secret based on a subscriber's secret specific to the subscriber identity;
a fourth module for sending from the mobile client the at least one challenge to a subscriber identity module; and
a fifth module for receiving at the mobile client at least one second secret in response to the at least one challenge, wherein the second secret is arranged to be used for authenticating the mobile client to the communication system separate from the mobile telecommunication network.

26. The apparatus according to claim 25, further comprising:
a user interface for receiving a personal identification number from a user; and
a transmitter for transmitting wirelessly the personal identification number to the mobile station.

27. The apparatus according to claim 26, further comprising:
a encrypter for encrypting the personal identification number before transmitting the personal identification number.

28. The apparatus according to claim 25 wherein the fifth module further comprises:
an encrypter for encrypting the second secret to provide a encrypted second secret; and
a transmitter for transmitting the encrypted second secret to the communication system.

29. The apparatus according to claim 25 wherein the fifth module is configured to refresh the encrypted second secret.

30. The apparatus according to claim 25, further comprising a transmitter for sending wirelessly the subscriber identity to the authentication block; and
a receiver for receiving wirelessly from the authentication block.

31. The apparatus according to claim 25, further comprising a receiver for receiving wirelessly from the mobile station the subscriber identity; and
a transmitter for sending wirelessly the at least one challenge;
wherein the receiver is configured to receive wirelessly at least one second secret.

32. The apparatus according to claim 31, further comprising:
a user interface for receiving a personal identification number from a user; and
wherein the transmitter is configured to transmit wirelessly the personal identification number to the mobile station.

33. The apparatus according to claim 31, wherein the transmitter is configured to transmit an infrared signal.

34. The apparatus according to claim 31, wherein the transmitter is configured to transmit a radio signal.

35. The apparatus according to claim 31, wherein the transmitter is configured to transmit a low power radio signal.

36. The apparatus according to claim 31, wherein the transmitter is configured to transmit an acoustic signal.

37. The apparatus of claim 25, wherein the second module is configured to send the subscriber identity from the mobile client to the authentication block via the communication system.

38. An apparatus, comprising:
a first module for retrieving from a subscriber identity module a subscriber identity corresponding to a subscriber of a mobile telecommunication network;
a second module for sending wirelessly the subscriber identity to a mobile client for authenticating the client to a communication system separate from the mobile telecommunication network;
a third module for receiving wirelessly from the mobile client at least one challenge based on a subscriber's secret specific to the subscriber identity;
a fourth module for generating at least one secret in response to the at least one challenge; and
a fifth module for sending wirelessly the at least one secret.

39. The apparatus of claim 38, further comprising a receiver for wirelessly receiving a request.

40. The apparatus of claim 39 wherein the request contains a personal identification number.

41. The apparatus of claim 40, further comprising a comparator for confirming that the personal identification number matches a identity module personal identification number.

42. The apparatus of claim 39 wherein the request contains an encrypted personal identification number.

* * * * *